United States Patent [19]

Smith

[11] Patent Number: 5,604,425
[45] Date of Patent: Feb. 18, 1997

[54] POWER LIMITING REGULATOR

[75] Inventor: Lawrence E. Smith, Noblesville, Ind.

[73] Assignee: Thomson Consumer Electronics, Inc., Indianapolis, Ind.

[21] Appl. No.: 287,591

[22] Filed: Aug. 8, 1994

[51] Int. Cl.[6] .......................... G05F 1/577; H02M 3/335
[52] U.S. Cl. ........................ 323/267; 363/21; 363/89
[58] Field of Search ..................... 323/231, 267, 323/276, 313, 907; 363/21, 89; 307/11, 28; 327/513

[56] References Cited

U.S. PATENT DOCUMENTS

| | | | |
|---|---|---|---|
| 2,976,475 | 3/1961 | Dodge | 323/9 |
| 3,174,093 | 3/1965 | Finkelstein . | |
| 3,182,246 | 5/1965 | Lloyd | 323/22 |
| 3,201,606 | 8/1965 | Marnon | 307/88.5 |
| 3,214,668 | 10/1965 | Brinster | 318/345 |
| 3,431,486 | 3/1969 | Fruehling et al. | 323/9 |
| 3,461,376 | 8/1969 | Wanlass | 323/22 |
| 3,579,039 | 5/1971 | Damon | 317/22 |
| 3,624,490 | 11/1971 | Fisher | 323/9 |
| 3,961,208 | 6/1976 | Khanna | 327/513 |
| 4,063,147 | 12/1977 | Hatanaka et al. | 323/22 |
| 4,290,004 | 9/1981 | Smith | 323/311 |
| 4,298,892 | 11/1981 | Scott | 358/190 |
| 4,322,674 | 3/1982 | Kanno | 323/231 |
| 4,488,106 | 12/1984 | Chernotsky et al. | 323/239 |
| 4,521,725 | 6/1985 | Phaneuf | 323/282 |
| 4,636,709 | 1/1987 | Ohsawa | 323/267 |
| 4,658,205 | 4/1987 | Yamada | 323/313 |
| 4,761,723 | 8/1988 | Lendaro | 363/21 |
| 4,837,653 | 6/1989 | Yip | 361/86 |
| 4,884,161 | 11/1989 | Atherton et al. | 361/18 |
| 4,945,465 | 7/1990 | Marinus et al. | 363/89 |
| 5,087,870 | 2/1992 | Salesky et al. | 323/276 |
| 5,412,308 | 5/1995 | Brown | 323/267 |

*Primary Examiner*—Peter S. Wong
*Assistant Examiner*—Adolf Berhane
*Attorney, Agent, or Firm*—Joseph S. Tripoli; Joseph J. Laks; Sammy S. Henig

[57] ABSTRACT

A source of an input supply voltage is coupled via a current limiting resistor to a load. A diode has a first terminal that is coupled to a junction terminal between the resistor and the load. A second terminal of the diode is coupled to an output of a regulated power supply where a regulated supply voltage is developed. The diode clamps a second output supply voltage developed at the first terminal of the diode to the regulated supply voltage. When the power in the load exceeds a predetermined value, the diode ceases conducting. In this way, the conductor that couples the second output supply voltage to the load need not meet the strict 15 watt node spacing requirements.

9 Claims, 2 Drawing Sheets

POWER LIMITING REGULATOR

The invention relates to the field of power limiting in power supplies.

The amount of the spacing between the conductors of a printed circuit board for consumer electronic circuits such as, for example, a television receiver, are established by regulatory organizations. The regulations impose strict requirements, for example, on the spacing between adjacent conductors, when at least one of the conductors is connected to an output terminal or node of a supply voltage capable of supplying more than 15 watts to a load. Thus, the spacing between conductors is required to be larger than when the power supply node is not capable of supplying at least 15 watts. Such requirements are referred to as the 15 watt node requirements. Disadvantageously, the larger spacing results in a larger printed circuit board area.

A power supply in a television receiver may be required to supply a total power that is significantly greater than 15 watts. The power may be distributed via conductors to various circuits. Some of the circuits are low power circuits that require less than 15 watts. In order to reduce the printed circuit board area that is otherwise needed for complying with the 15 watt node requirements, it may be desirable to limit the maximum power that can be derived by such low power circuits to less than 15 watts, even when abnormal conditions such as short circuit or failure of components occur.

When the maximum power that can be delivered via a given power supply node is limited to 15 watts, the 15 watt node requirements are not applicable. Advantageously, cost and circuit board area can be reduced. It is also desirable to attain such power limiting without sacrificing regulation in normal operation.

In a power supply embodying an inventive feature, a regulated power supply is energized by a DC input supply voltage. A first regulated voltage is produced at a first output terminal of the regulated power supply. The power that can be derived from the output terminal can be, for example, greater than 15 watts. Therefore, conductors that are connected directly to the output terminal are, for example, subject to the 15 watt node requirements. The input supply voltage is also coupled via a resistor that provides power limiting and via a clamping diode to the first output terminal of the regulated power supply. The diode is poled to conduct continuously in normal operation. The diode clamps or regulates a second supply voltage that is developed at a terminal of the diode, remote from the first output terminal. Conductors of a low power circuit that derive in normal operation less than 15 watts may be energized via the terminal of the diode. The aforementioned power limiting arrangement limits the maximum power that can be obtained via the power limiting arrangement to less than 15 watts even when a fault condition occurs.

The diode is poled in a direction that prevents the flow of current from the first output terminal, that is subject to the 15 watt node requirement, to the low power circuits Therefore, advantageously, the terminal of the diode where the second supply voltage is generated is not subject to the 15 watt node requirement. Advantageously, the second supply voltage tracks and is regulated by the first regulated voltage because of the clamping operation of the diode.

A power supply, embodying an inventive feature, includes a voltage regulator for applying a first regulated supply voltage to a first load. A power limiting impedance is used for applying a second supply voltage to a second load. A clamping arrangement is used for clamping the second supply voltage to the first regulated voltage to regulate the second supply voltage. Power transfer from the voltage regulator of the first supply voltage to the second load via the clamping arrangement is prevented.

Figure 1:
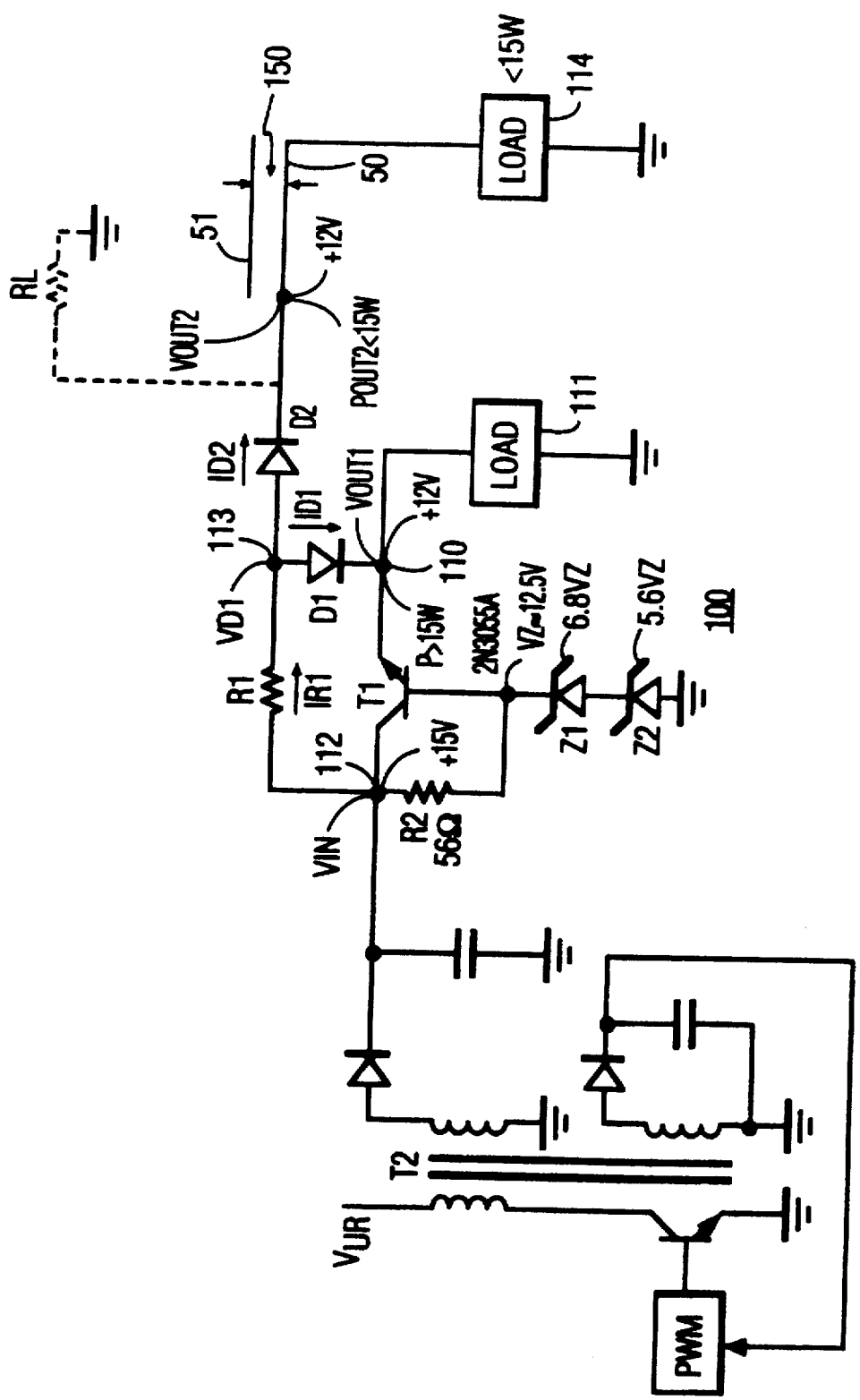
FIG. 1 illustrates a power supply, embodying an aspect of the invention.

A conventional switch mode power supply 101 shown in FIG. 1, regulated by a pulse width modulator PWM, produces at a terminal 112 an input supply voltage VIN for energizing a power supply 100, embodying an aspect of the invention.

Voltage VIN is coupled via a series-pass regulator transistor T1 to a load 111. A regulating base voltage VZ for transistor T1 is developed in a pair of zener diodes Z1 and Z3 that are coupled in series. A resistor R2 supplies a reverse current in zener diodes Z1 and Z2. Consequently, an output supply voltage VOUT1 at the emitter of transistor T1 is regulated. Voltage VOUT1 is developed at a supply node terminal 110 that is capable, for example, of supplying more than 15 watts.

A series arrangement of a power or current limiting resistor R1 and a clamping diode D1, embodying an inventive feature, is coupled between terminals 112 and 110, across the collector-emitter junction of transistor T1. A level shifting and temperature compensating diode D2 couples a supply voltage VD1 developed at a terminal 113, between resistor R1 and diode D1, to a load 114 for producing an output supply voltage VOUT2. Voltage VOUT2 is coupled via a conductor 50 to load 114 for energizing the load.

In normal operation, diode D1 continuously conducts. The continuous conduction is assured by the selection of a sufficiently small value of resistor R1, such that a current IR1 in resistor R1 equals or exceeds a load current ID2 in diode D2. Therefore, voltage VOUT2 tracks and is clamped to voltage VOUT1. Diode D2 provides temperature compensation with respect to forward voltage variation of clamping diode D1. Voltage VOUT2 is approximately equal to voltage VOUT1.

In normal operation, all the loads that are energized via diode D2, together as depicted by an equivalent resistor RL, consume less than, for example, 15 watts. The value of resistor R1 is chosen such that power consumption in the loads that are energized via diode D2, is less than, for example, 14 watts. Such value is selected to be smaller than 15 watts under any loading conditions via diode D2.

A current iD1 in diode D1 cannot flow in a direction opposite to that shown by the arrow, from transistor T1 to load 114. thus, power cannot be supplied via terminal 110 to load 114. The entire power supplied via diode D2, referred to as POUT2, is supplied via resistor R1. It follows that diode D1 isolates terminal 113 from terminal 110 with respect to power delivery. Because of the current or power limiting action of resistor R1, power POUT2 supplied via diode D2 is limited to less than 15 watts. Therefore, conductor 50 is not subject to the 15 watt node requirements. Consequently, advantageously, a spacing 150 between conductor 50 and any other conductor such as a conductor 51 need not meet the strict 15 watt node requirements.

When current ID2 becomes excessive, the voltage drop across resistor R1 causes a corresponding voltage drop in voltage VD1 that back-biases diode D1. Therefore, diode D1 becomes nonconductive and the regulation of voltage VOUT2 is no longer effective. Whereas, advantageously, as long as diode D1 is conductive, voltage VOUT2 is clamped by diode D1 to voltage VOUT1.

Figure 2A:
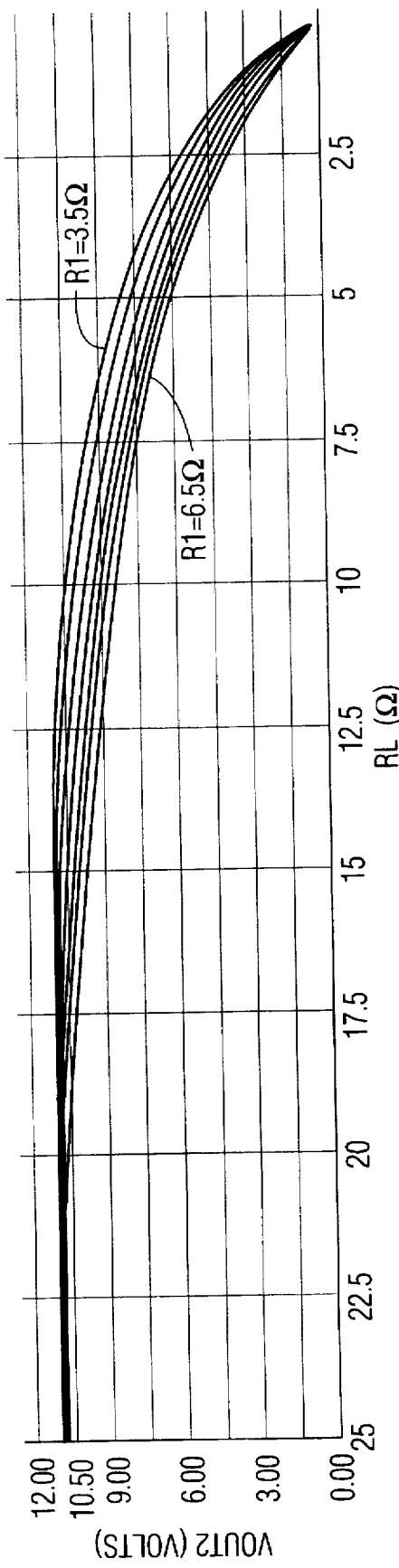
FIGS. 2a and 2b illustrates family of curves useful for explaining the operation of the arrangement of FIG. 1.
Figure 2B:
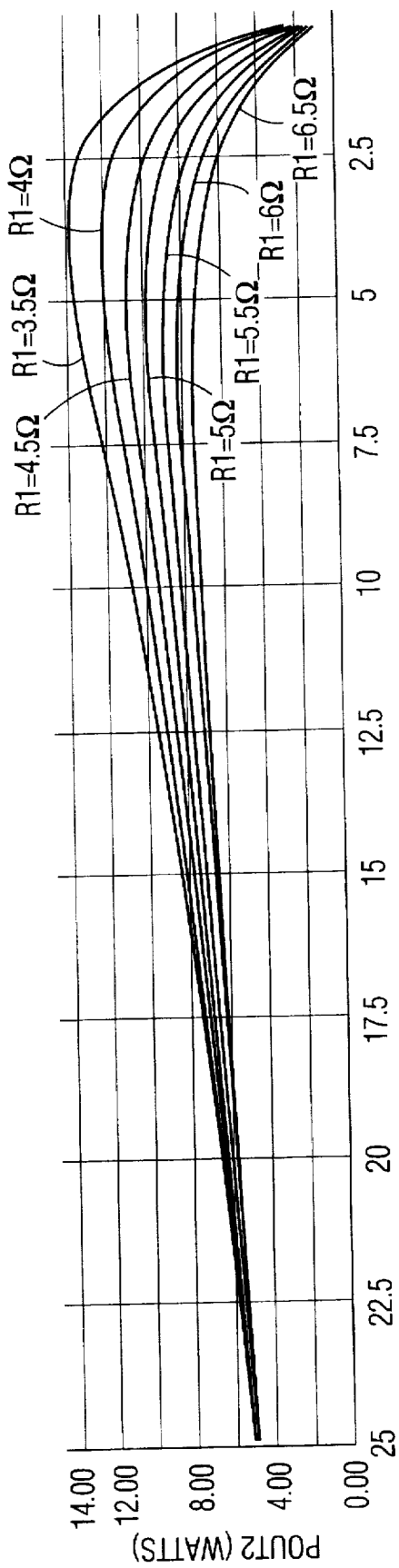

FIGS. 2a and 2b illustrate a family of curves of voltage VOUT2 and power POUT2, respectively, as a function of resistor R1 and an equivalent load resistor RL of FIG. 1. Similar symbols and numerals in FIGS. 1, 2a and 2b indicate similar numbers or functions. Resistor RL of FIG. 1 represents the entire or equivalent load that is energized via diode D2. Power POUT2 is the entire power that is dissipated in the load represented by resistor RL as a result of the current in diode D2.

As shown in FIG. 2a, for resistor R1=3.5 Ω, voltage VOUT2 varies by less than 10% over a substantially large range of variation of load. As shown in FIG. 2b, power POUT2 cannot exceed 14 watts for an entire range of values of resistors RL and R1 of FIG. 1. When power POUT2 of FIG. 2b is excessive, such as, for example, when it is equal to 14 watts, voltage VOUT2 decreases such that diode D1 becomes non-conductive. Diode D1 prevents power transfer from transistor T1 to, for example, load 114. In this way, diode D1 prevents transistor T1 from supplying any portion of power POUT2. Thus, terminal 113, diode D2 and conductor 50 are not subject to the 15 watt node requirements. Whereas, terminal 110 may be subject to the 15 watt node requirements. This is so because diode D1 prevents power transfer from transistor T1 to, for example, load 114.

What is claimed is:

1. A power supply, comprising:

a voltage regulator for applying a first regulated supply voltage to a first load;

a power limiting impedance for applying a second supply voltage to a second load; and a first diode having a first terminal coupled to said impedance and a second terminal coupled to said first regulated supply voltage for regulating said second supply voltage by clamping said second supply voltage to said first supply voltage and for isolating said voltage regulator from said second load to prevent said voltage regulator from energizing said second load.

2. A power supply according to claim 1 further comprising, a second diode that is coupled between said second load and said first diode to provide for temperature compensation with respect to variations in said first diode.

3. A power supply according to claim 1 wherein said impedance comprises a resistor.

4. A power supply according to claim 3 wherein said first diode and said resistor are coupled in series.

5. A power supply according to claim 3 wherein said second diode is coupled in series with said resistor and between said resistor and said second load.

6. A power supply according to claim 1 wherein said regulator comprises series pass regulator.

7. A power supply, comprising:

a voltage regulator for applying a first regulated supply voltage to a first load;

a power limiting impedance for applying a second supply voltage to a second load;

a first diode coupled to said impedance and to said first regulated supply voltage;

said first diode being conductive in a first mode during normal operation of said second load, in which said first diode clamps said second supply voltage to said first regulated supply voltage; and said first diode being non-conductive in a second mode during abnormal operation of said second load, in which said second supply voltage decreases as current through said power limiting impedance increases due to said abnormal operation, thereby limiting the power delivered to said second load to a predetermined maximum value.

8. A power supply, comprising:

a voltage regulator for applying a first regulated supply voltage to a first load;

a power limiting impedance for applying a second supply voltage to a second load; and means coupled to said impedance and to said first regulated voltage for clamping said second supply voltage to said first regulated voltage to regulate said second supply voltage such that power transfer from said voltage regulator of said first supply voltage to said second load via said clamping means is prevented.

9. A power supply according to claim 8 wherein said clamping means comprises a diode.

* * * * *